United States Patent
Christ et al.

(10) Patent No.: US 10,480,647 B2
(45) Date of Patent: Nov. 19, 2019

(54) TECHNIQUES FOR CONTROLLING PEDAL-OFF DOWNSHIFTS OF A VEHICLE TRANSMISSION

(71) Applicants: Steven B Christ, Ann Arbor, MI (US); Stephen Tokish, Sylvania, OH (US); Quan Zheng, Superior Township, MI (US)

(72) Inventors: Steven B Christ, Ann Arbor, MI (US); Stephen Tokish, Sylvania, OH (US); Quan Zheng, Superior Township, MI (US)

(73) Assignee: FCA US LLC, Auburn Hills, MI (US)

( * ) Notice: Subject to any disclaimer, the term of this patent is extended or adjusted under 35 U.S.C. 154(b) by 114 days.

(21) Appl. No.: 15/901,478

(22) Filed: Feb. 21, 2018

(65) Prior Publication Data

US 2019/0257417 A1    Aug. 22, 2019

(51) Int. Cl.
| | |
|---|---|
| *F16H 61/08* | (2006.01) |
| *F16H 61/04* | (2006.01) |
| *F16H 61/02* | (2006.01) |
| *F16H 59/38* | (2006.01) |
| *F16H 59/40* | (2006.01) |
| *F16H 59/48* | (2006.01) |
| *B60W 10/11* | (2012.01) |
| *B60W 50/00* | (2006.01) |

(Continued)

(52) U.S. Cl.
CPC .......... *F16H 61/08* (2013.01); *F16H 61/0204* (2013.01); *F16H 61/0437* (2013.01); *B60W 10/11* (2013.01); *B60W 30/18072* (2013.01); *B60W 30/19* (2013.01); *B60W 2050/0026* (2013.01); *B60W 2510/1015* (2013.01); *B60W 2510/1045* (2013.01); *B60W 2710/10* (2013.01); *F16H 59/40* (2013.01); *F16H 59/48* (2013.01); *F16H 2059/385* (2013.01); *F16H 2061/0459* (2013.01)

(58) Field of Classification Search
CPC .. F16H 61/08; F16H 61/0204; F16H 61/0437; F16H 59/48; F16H 2061/059; F16H 59/40; F16H 2059/385; B60W 10/11; B60W 30/18072; B60W 30/19; B60W 2050/0026; B60W 2510/1045; B60W 2510/1015; B60W 2710/10
USPC .......................................................... 701/55
See application file for complete search history.

(56) References Cited

U.S. PATENT DOCUMENTS

| | | | |
|---|---|---|---|
| 1,907,115 A | 5/1933 | Jencick | |
| 5,063,814 A * | 11/1991 | Baba .................. | F16H 61/0437 477/154 |

(Continued)

*Primary Examiner* — Roger L Pang
(74) *Attorney, Agent, or Firm* — Ralph E. Smith

(57) ABSTRACT

A transmission control system and method involve receiving, by a controller and from a turbine shaft speed sensor, a rotational speed of a turbine shaft of an automatic transmission, receiving, by the controller and from an output shaft speed sensor, a plurality of rotational speeds of an output shaft of the transmission, determining, by the controller, a shift time modifier based on the turbine shaft speed and a gradient of the output shaft speed, modifying, by the controller, a shift time for a pedal-off downshift of the transmission based on the shift time modifier to obtain a modified shift time, and controlling, by the controller, the pedal-off downshift of the transmission based on the modified shift time.

12 Claims, 2 Drawing Sheets

(51) Int. Cl.
*B60W 30/19* (2012.01)
*B60W 30/18* (2012.01)

(56) References Cited

U.S. PATENT DOCUMENTS

| | | | | |
|---|---|---|---|---|
| 5,547,437 | A | * | 8/1996 | Kamada ................ F16H 61/061 477/143 |
| 5,954,776 | A | * | 9/1999 | Saito ....................... F16H 61/08 477/115 |
| 6,068,576 | A | | 5/2000 | Tsutsui et al. |
| 6,530,291 | B1 | * | 3/2003 | Shimoda ............. F16H 61/0213 477/154 |
| 6,625,535 | B2 | | 9/2003 | Han et al. |
| 8,380,406 | B2 | | 2/2013 | MacFarlane et al. |
| 8,560,195 | B2 | * | 10/2013 | Iwamoto ............... F16H 61/061 701/66 |
| 2008/0096721 | A1 | | 4/2008 | Honma et al. |

* cited by examiner

TECHNIQUES FOR CONTROLLING PEDAL-OFF DOWNSHIFTS OF A VEHICLE TRANSMISSION

FIELD

The present application generally relates to vehicle transmissions and, more particularly, to techniques for controlling pedal-off downshifts of a vehicle transmission.

BACKGROUND

An automatic transmission transfers drive torque from a torque generating device (an engine, an electric motor, etc.) to a driveline of a vehicle. A gear ratio of the transmission specifies a ratio of a speed of an input or turbine shaft of the transmission to a speed of an output shaft of the transmission. When a driver of the vehicle stops providing input via an accelerator device (e.g., a pedal), the vehicle decelerates and a "pedal-off downshift" to a higher gear ratio is performed. Due to external factors (road resistance, road grade, etc.), the speed of the output shaft of the transmission could decrease drastically, resulting in a rough or otherwise inconsistent gear shift due to a large turbine shaft speed gradient. Accordingly, while such transmission control systems work well for their intended purpose, there remains a need for improvement in the relevant art.

SUMMARY

According to one example aspect of the invention, a control system for an automatic transmission of a vehicle is presented. In one exemplary implementation, the system comprises a turbine shaft speed sensor configured to measure a rotational speed of a turbine shaft of the transmission, an output shaft speed sensor configured to measure a rotational speed of an output shaft of the transmission, and a controller configured to: determine a shift time modifier based on the turbine shaft speed and a gradient of the output shaft speed, modify a shift time for a pedal-off downshift of the transmission based on the shift time modifier to obtain a modified shift time, and control the pedal-off downshift of the transmission based on the modified shift time to achieve a smoother downshift.

In some implementations, the control of the pedal-off downshift of the transmission based on the modified shift time achieves a consistent downshift compared to other downshift operations of the vehicle. In some implementations, a gradient of the turbine shaft speed remains approximately constant. In some implementations, the transmission is a front-wheel drive dog clutch nine-speed transmission.

In some implementations, the controller is configured to utilize a two-dimensional lookup table that relates various shift time modifiers to various turbine shaft speeds and output shaft speed gradients. In some implementations, larger turbine shaft speeds and larger output shaft speed gradients each correspond to larger shift time modifiers. In some implementations, the modified shift time is less than the shift time.

According to another example aspect of the invention, a method for performing a gear shift of an automatic transmission of a vehicle is presented. In one exemplary implementation, the method comprises: receiving, by a controller and from a turbine shaft speed sensor, a rotational speed of a turbine shaft of the transmission, receiving, by the controller and from an output shaft speed sensor, a plurality of rotational speeds of an output shaft of the transmission, determining, by the controller, a shift time modifier based on the turbine shaft speed and a gradient of the output shaft speed, modifying, by the controller, a shift time for a pedal-off downshift of the transmission based on the shift time modifier to obtain a modified shift time, and controlling, by the controller, the pedal-off downshift of the transmission based on the modified shift time to achieve a smoother downshift.

In some implementations, controlling the pedal-off downshift of the transmission based on the modified shift time achieves a consistent downshift compared to other downshift operations of the vehicle. In some implementations, a gradient of the turbine shaft speed remains approximately constant. In some implementations, the transmission is a front-wheel drive dog clutch nine-speed transmission.

In some implementations, determining the shift time modifier includes utilizing, by the controller, a two-dimensional lookup table that relates various shift time modifiers to various turbine shaft speeds and output shaft speed gradients. In some implementations, larger turbine shaft speeds and larger output shaft speed gradients each correspond to larger shift time modifiers. In some implementations, the modified shift time is less than the shift time.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, pedal-off downshifts are often rough or otherwise inconsistent compared to other transmission shift operations. Accordingly, techniques are presented for controlling an automatic transmission to provide smoother and/or consistent pedal-off shift operations. These techniques involve adjusting a shift time based on the turbine shaft speed and a gradient or rate of change of the output shaft speed. These two speeds are utilized (e.g., using a two-dimensional surface or look-up table) to determine a shift time modifier that applied to a base shift time. It will be appreciated that the base shift time could vary for each vehicle application and may depend on various factors and models. The shorter, modified shift time is then utilized in controlling the pedal-off downshift of the transmission.

Figure 1:
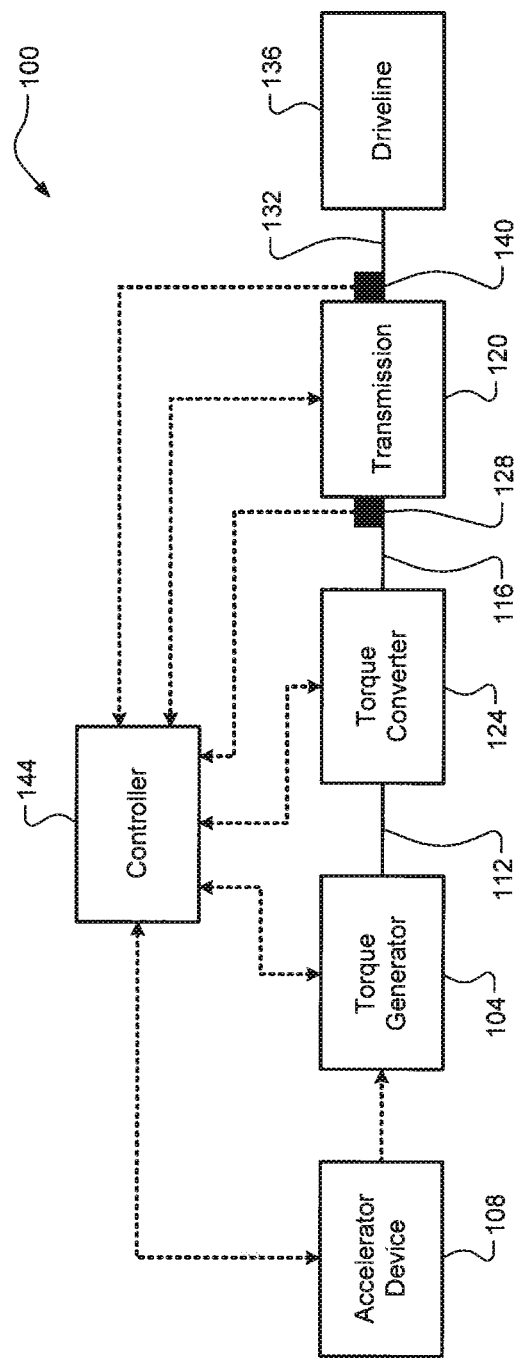
FIG. 1 is a functional block diagram of an example vehicle according to the principles of the present disclosure.

Referring now to FIG. 1, a functional block diagram of an example vehicle 100 is illustrated. The vehicle 100 includes a torque generator (an engine, an electric motor, a combination thereof, etc.) that generates drive torque based on an input from an accelerator device 108 (e.g., an accelerator pedal). It will be appreciated that the term "pedal-off downshift" refers to a downshift that occurs when no input is being provided via the accelerator device 108. This is different than a "power-off downshift" because the torque generator 104 may still be generating drive torque (e.g., idling) during the shift operation. A crankshaft or output shaft 112 of the torque generator 104 is selectively coupled to an input or turbine shaft 116 of an automatic transmission 120 via a torque converter 124 (e.g., a fluid coupling). A turbine shaft speed sensor 128 measures a rotational speed of the turbine shaft 116.

The transmission 120 is configured to provide a plurality of different gear ratios. In one exemplary implementation, the transmission 120 is a front-wheel drive dog clutch nine-speed transmission. An output shaft 132 of the transmission 120 is coupled to a driveline 136 of the vehicle 100. An output shaft speed sensor 140 measures a rotational speed of the output shaft 132. A controller 144 controls operation of the vehicle 100, including controlling the torque generator 104 to generate a desired drive torque based on a driver torque request provided via the accelerator device 108. The controller 144 also controls shift operations between the various gear ratios of the transmission 120 according to a specified shift time, which is discussed in greater detail below.

Figure 2:
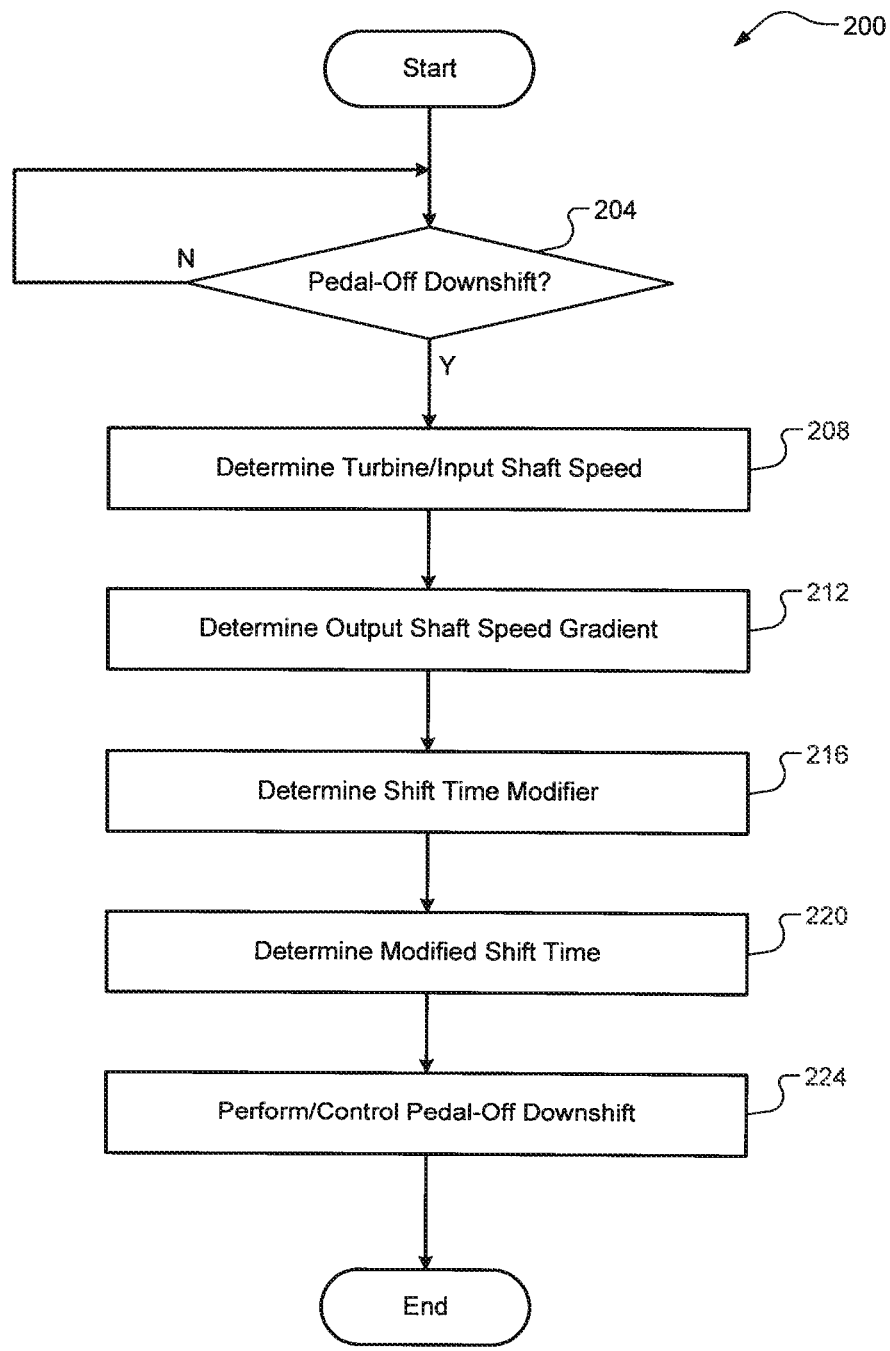
FIG. 2 is a flow diagram of an example method for performing a gear shift of a transmission of a vehicle according to the principles of the present disclosure.

Referring now to FIG. 2, a flow diagram of an example method 200 for performing a gear shift of the transmission 120 of the vehicle 100 is illustrated. At 204, the controller 144 determines whether a pedal-off downshift is imminent. This determination is made based on various operating parameters such as vehicle speed and engine/motor speed and whether any input is being provided via the accelerator device 108. If a pedal-off downshift is about to be performed, the method 200 proceeds to 208. Otherwise, the method 200 ends or returns to 204. At 208, the controller 144 determines the turbine shaft speed based on measurements from the turbine shaft speed sensor 128. At 212, the controller 144 determines the output shaft speed gradient based on measurements from the output shaft speed sensor 140 (e.g., a rate of change of the speed of the output shaft 132 over a specified period).

At 216, the controller 144 determines a shift time modifier based on the turbine shaft speed and the output shaft speed gradient. In one exemplary implementation, this involves utilizing a two-dimensional surface or look-up table such as the one shown below in Table 1. Each value in Table 1 represents a shift time modifier (in seconds) that is then applied to a base shift time. For example, if the output shaft speed gradient is −250 revolutions per minute (RPM) and the turbine shaft speed is 4000 RPM at the start of the pedal-off downshift, the shift time modifier is −0.20 seconds.

TABLE 1

| | | Output Shaft Speed Gradient (RPM) | | | | |
|---|---|---|---|---|---|---|
| | | 0 | −100 | −250 | −500 | −1000 |
| Turbine | 7000 | 0 | −0.15 | −0.20 | −0.29 | −0.38 |
| Shaft | 5500 | 0 | −0.13 | −0.20 | −0.28 | −0.29 |
| Speed | 4000 | 0 | −0.13 | −0.20 | −0.23 | −0.28 |
| (RPM) | 2500 | 0 | −0.11 | −0.20 | −0.20 | −0.28 |
| | 1000 | 0 | −0.10 | −0.10 | −0.18 | −0.25 |

At 220, the controller 144 determines a modified shift time by applying the shift time modifier to a base shift time. For example, if the base shift time is 1.50 seconds and the shift time modifier is −0.20 seconds, the modified shift time would be 1.30 seconds. At 224, the controller 144 controls the pedal-off downshift based on the modified shift time. This involves the hydraulic actuation of various clutches within the modified shift time in order to actuate a desired gear ratio of the transmission 120. By shortening the shift time, a gradient or rate of change of the turbine shaft speed remains constant or approximately constant. The constant turbine speed gradient results in a smoother and/or consistent shift operation. The method 200 then ends or returns to 204.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a transmission of a vehicle, the system comprising:
   a turbine shaft speed sensor configured to measure a rotational speed of a turbine shaft of the transmission;
   an output shaft speed sensor configured to measure a rotational speed of an output shaft of the transmission; and
   a controller configured to:
      determine a shift time modifier based on the turbine shaft speed and a gradient of the output shaft speed;
      modify a shift time for a pedal-off downshift of the transmission based on the shift time modifier to obtain a modified shift time; and
      control the pedal-off downshift of the transmission based on the modified shift time,
      wherein the control of the pedal-off downshift based on the modified shift time achieves a smoother and consistent pedal-off downshift operation compared to other transmission downshift operations of the vehicle without such control.

2. The system of claim 1, wherein a gradient of the turbine shaft speed remains approximately constant.

3. The system of claim 1, wherein the controller is configured to utilize a two-dimensional lookup table that relates various shift time modifiers to various turbine shaft speeds and output shaft speed gradients.

4. The system of claim 3, wherein larger turbine shaft speeds and larger output shaft speed gradients each correspond to larger shift time modifiers.

5. The system of claim 3, wherein the modified shift time is less than the shift time.

6. The system of claim 1, wherein the transmission is a front-wheel drive dog clutch nine-speed transmission.

7. A method for performing a gear shift of a transmission of a vehicle, the method comprising:

receiving, by a controller and from a turbine shaft speed sensor, a rotational speed of a turbine shaft of the transmission;

receiving, by the controller and from an output shaft speed sensor, a plurality of rotational speeds of an output shaft of the transmission;

determining, by the controller, a shift time modifier based on the turbine shaft speed and a gradient of the output shaft speed;

modifying, by the controller, a shift time for a pedal-off downshift of the transmission based on the shift time modifier to obtain a modified shift time; and controlling, by the controller, the pedal-off downshift of the transmission based on the modified shift time so as to achieve a smoother and consistent pedal-off downshift operation as compared to other transmission downshift operations of the vehicle without such control.

8. The method of claim 7, wherein a gradient of the turbine shaft speed remains approximately constant.

9. The method of claim 7, wherein determining the shift time modifier includes utilizing, by the controller, a two-dimensional lookup table that relates various shift time modifiers to various turbine shaft speeds and output shaft speed gradients.

10. The method of claim 9, wherein larger turbine shaft speeds and larger output shaft speed gradients each correspond to larger shift time modifiers.

11. The method of claim 9, wherein the modified shift time is less than the shift time.

12. The method of claim 7, wherein the transmission is a front-wheel drive dog clutch nine-speed transmission.

* * * * *